United States Patent
Wallace et al.

(10) Patent No.: US 6,624,944 B1
(45) Date of Patent: Sep. 23, 2003

(54) FLUORINATED COATING FOR AN OPTICAL ELEMENT

(75) Inventors: Robert M. Wallace, Richardson, TX (US); Marvin W. Cowens, Plano, TX (US); Steven A. Henck, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1040 days.

(21) Appl. No.: 08/824,594

(22) Filed: Mar. 26, 1997

Related U.S. Application Data

(60) Provisional application No. 60/017,825, filed on Mar. 29, 1996.

(51) Int. Cl.[7] .............................. G02B 1/10; G02B 26/02
(52) U.S. Cl. ...................... 359/580; 359/586; 359/291; 359/230; 359/231
(58) Field of Search ................... 359/580, 291, 359/846, 586, 230, 231; 524/850, 548, 405; 428/35.7, 333; 427/517

(56) References Cited

U.S. PATENT DOCUMENTS

| | | | | |
|---|---|---|---|---|
| 4,066,814 A | * | 1/1978 | Chiklis | 428/333 |
| 4,526,920 A | * | 7/1985 | Sakashita et al. | 524/850 |
| 5,324,586 A | | 6/1994 | Klocek et al. | |
| 5,331,454 A | | 7/1994 | Hornbeck | |
| 5,447,600 A | | 9/1995 | Webb | |
| 5,579,151 A | * | 11/1996 | Cho | 359/846 |
| 5,639,464 A | * | 6/1997 | Terry et al. | 424/405 |

\* cited by examiner

*Primary Examiner*—Audrey Chang
(74) *Attorney, Agent, or Firm*—Wade James Brady, III; Frederick J. Telecky, Jr.

(57) ABSTRACT

A protective cover (10) for an optical device, such as a spatial light modulator or an infrared detector or receiver. The cover (10) has an optically transmissive window (11), which has a coating (12) on one or both of its surfaces. The coating (12) is made from a halogenated material, which is deposited to form a chemical bond with the surface of the window (11).

24 Claims, 1 Drawing Sheet

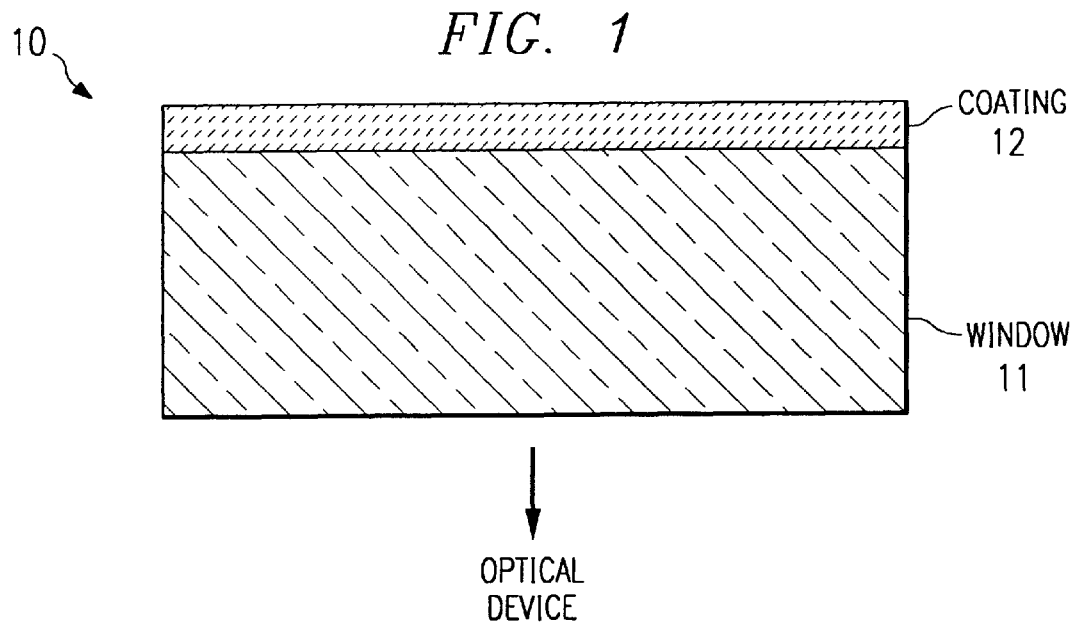
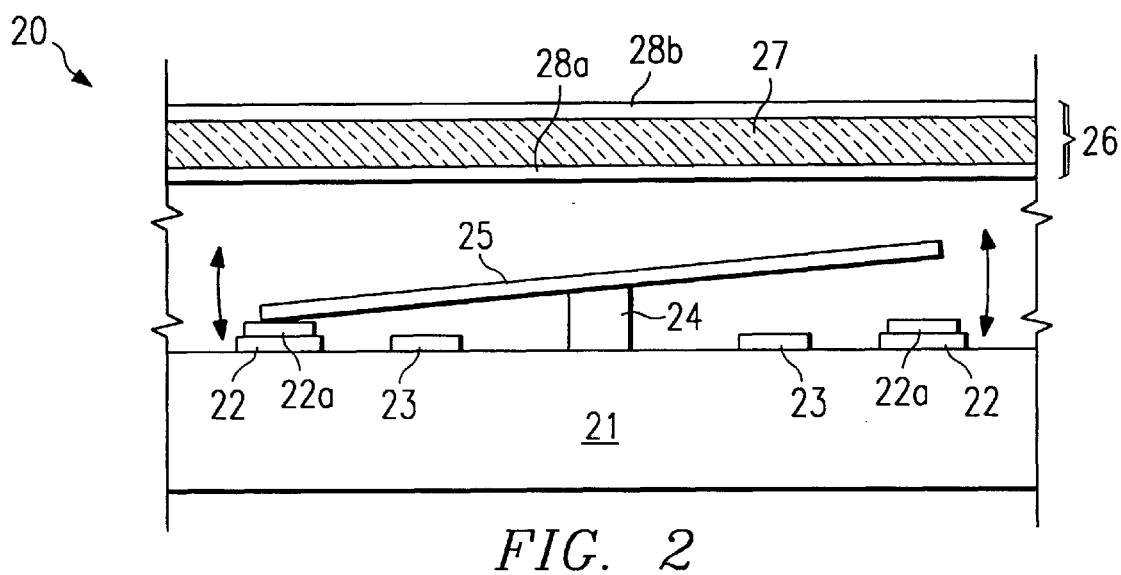

FLUORINATED COATING FOR AN OPTICAL ELEMENT

This application claim priority under 35 U.S.C. §119 (e)(1) of provisional application number 60/017,825, filed Mar. 29, 1996.

TECHNICAL FIELD OF THE INVENTION

The present invention relates generally to optical devices, and more particularly, to a coating for an optical element such as a window over the illuminating or illuminated surface of an optical device.

BACKGROUND OF THE INVENTION

Various light transmissive coatings have been used to protect optical elements. For example, the optical element might be a window that covers an optical device that emits or receives radiation. A coating on the window might provide some desired characteristic to the cover. Two examples of factors that enter into the selection of material for such coatings are the type of incident radiation on the device, or emitted radiation from the device, and the environment in which the device will be used.

An example of a coated window for an optical device is described in U.S. Pat. No. 5,324,856, entitled "Polymeric Infrared Optical Protective Coating", assigned to Texas Instruments Incorporated. It describes the use of various polymeric coatings on a window to provide a low hardness and high strength cover for the device. The polymers of choice provide infrared transmissivity in a desired wavelength range.

SUMMARY OF THE INVENTION

One aspect of the invention is an optically transmissive cover for an optical device. The cover is comprised of a window having an inner surface and an outer surface with respect to the optical device. A coating on at least one of the window's surfaces is made from a halogenated material. The coating is deposited using a deposition process, such as "semiconductor deposition processes" as defined herein, and such that the halogenated material is chemically bonded to the window. An example of a suitable halogenated material is a perfluorinated material, which imparts a hydrophobic quality to the cover.

In addition to use of the cover with optical devices that benefit from the hydrophobic quality of the cover, a particular application of the cover is for digital micro-mechanical (DMD) devices. In the case of a DMD, which has micro-mechanical elements housed under the cover, the coating can be made from the same material as the material used for lubricating or passivating surfaces of the micro-mechanical elements. The coating is placed on the inner surface of the window. It then prevents the inner surface of the window from being a chemically active sink for the lubrication or passivation material, as well as provides a source of molecules that migrate to the surfaces requiring lubrication or passivation.

BRIEF DESCRIPTION OF THE DRAWINGS

FIG. 1 illustrates a cover for an optical device in accordance with the invention.

FIG. 2 illustrates an element of a DMD device, having a cover in accordance with the invention.

DETAILED DESCRIPTION OF THE INVENTION

FIG. 1 illustrates a cover 10, comprising a window 11 and a coating 12, for a separate optical device. However, the same concept could be applied to a lens or other optical element that is not a cover for another device. In such cases, window 11 would be an optical element, such as a lens, having a coating on one or both of its surfaces.

The coating 12 of FIG. 1 is made from a halogenated material. In FIG. 1, coating 12 is on one surface of window 11, the inner surface with respect to the optical device. However, as explained below, in other embodiments, window 11 may having a coating on both surfaces.

Both window 11 and coating 12 are optically transmissive. As explained below, the device with which cover 10 is used may dictate the wavelength ranges for which window 11 and coating 12 are transmissive.

Depending on the optical device with which cover 10 is used, coating 12 provides at least one functionality. The uses of cover 10 with two particular devices, digital micro-mirror devices (DMDs) and infrared devices, are described below. In the case of a DMD, coating 12 eliminates a chemically active sink of, and provides a means of delivery for, passivation materials on the DMD's micro-mechanical elements. In the case of an infrared device, coating 12 provides hydrophobic protection from ambient moisture.

Window 11 is made from a suitable material, such as glass. Window 1i may be a lens or otherwise provide some optical effect.

Coating 12 is made from a halogenated material, where the halogen may be fluorine, chlorine, bromine, or other halogen. The chemistry of the material and the deposition process are such that a bond to the surface of window 11 is made during the deposition process, to chemically anchor the material to that surface.

An example of a suitable halogenated material is a perfluorinated material. A particular species of perfluorinated materials is the species of perfluorinated carboxylic acids. A particular example is perfluorodecanoic acid (PFDA). Longer chain (homologs) perfluorinated carboxylic acids, $(CF_3(CF_2)_n COOH$, where n=12, 14, 16, 18, ... ) may offer greater thermal stability than PFDA.

Other suitable perfluorinated materials are perfluorinated polymers. A particular example is perfluoro-polyether (PFPE), such as the PFPEs known commercially as FOMBLIN, DEMNUM, and KRYTOX. PFPEs may be vacuum deposited, nebulized, or delivered to the surface of window 11 neat or in solution.

A polymer such as TEFLON might also be used, deposited by evaporation or rendered in solution (for a spin-on deposition). A fluoro-polymer, such as TEFLON-AF, might be especially suitable.

One factor that may affect the choice of perfluorinated material for coating 12 is the surface chemistry of window 11. Some of the above materials, such as PFPEs may provide better adhesion than others.

Another factor that may affect the choice of perfluorinated material for coating 12 is a desire for coating 12 to be hydrophobic. For this functionality, perfluorinated materials that render fluorine atoms on the surface, such as PFDA, are especially suitable. Hydrophobicity provides protection from ambient moisture and assists in cleaning of cover 10. Depending on the application for which the optical device is used, the hydrophobic quality of coating 12 may call for its use on either the inner or outer surface of window 11 or on both surfaces. For example, where cover 10 is used on an outdoor infrared detector, it would be desirable to have coating 12 on at least the outer surface of window 11.

Coating 12 is sufficiently thin that it does not interfere with operation of the optical device. At the same time, coating 12 is thick enough to provide whatever functionality is desired for the particular application.

Typically, coating 12 is deposited on window 11 during a separate process, before cover 10 is placed over the optical device. The deposition process may begin with a surface cleaning step. This cleaning step may further provide "chemical activation" of the surface to be coated. As one example, the cleaning may be performed with an $O_2$/Ar plasma. As another example, the cleaning may be performed with a UV/$O_3$ process that combines UV radiation and ozone, producing a UV oxidation cleaning process.

The deposition process may be any one of various "semiconductor fabrication" processes, i.e., processes consistent with a semiconductor manufacturing process flow The processes described herein are examples of "semiconductor fabrication" processes. They include, but are not limited to, vapor deposition (e.g., vacuum sublimation), self-assembly in solution, or simply melting the perfluorinated species onto window 11. Solution deposition methods may provide better surface coverage than the vapor deposition processes. Certain perfluorinated materials, such as PFDA and PFPE, are especially good at forming end-functional groups to anchor coating 12 to window 11 through the formation of a chemical bond.

Some halogenated materials, when deposited with an appropriate deposition process, provide self-terminating layers of molecules. For example, the deposition process may result in a single layer ("monolayer"). Processes for providing a passivation monolayer on surfaces of micro-mechanical elements of a DMD are described in U.S. patent application Ser. No. 5,523,878 entitled "Self-Assembled Monolayer Coating for Micro-mechanical Devices", assigned to Texas Instruments Incorporated and incorporated herein by reference. This process may be adapted for depositing coating 12 on window 11.

Depending on the deposition process, both surfaces of window 11 may become coated, even though the particular application calls for coating on only one surface. In such applications, the extra coating is not detrimental to operation of the optical device.

One application for cover 10 is for a digital micro-mechanical device (DMD), such as the DMD manufactured by Texas Instruments Incorporated. A DMD has an array of micro-mechanical elements, each of which can be electronically rotated in one direction or another to either reflect light toward or away from an image. In this manner, full motion displays may be generated or images may be printed. An example of a DMD device for display or printing applications is described in U.S. Pat. No. 5,083,857, entitled "Multi-Level Deformable Mirror Device", assigned to Texas Instruments Incorporated and incorporated herein by reference.

The following description is in terms of a cover for a DMD, but such a cover would be useful for any light-reflecting or light-generating spatial light modulator or for a DMD device used for light switching. All of these devices are considered to be "micro-mechanical optical devices". Also, this description is in terms of a DMD having a deflectable element that contacts a landing surface, where the deflectable element's upper surface is a mirror. In other DMD devices, the deflectable element might be a yoke under a mirrored surface.

FIG. 2 is a side view of one micro-mechanical element 20 of a DMD device. DMD element 20 is part of an array of such elements, which has been manufactured using semiconductor fabrication techniques. DMD element 20 has at least a substrate 21, one or more landing surfaces 22, one or more address electrodes 23, one or more support posts 24, and a deflectable element 25. As indicated by the arrows, in the embodiment of FIG. 2, DMD element 20 has two possible landed positions. Thus, DMD element 20 has two landing surfaces 22 and two address electrodes 23. Other DMD embodiments might have "cantilevered" deflecting elements, each having one landing surface and one address electrode.

Substrate 21 contains address and control circuitry for providing electrical signals to address electrodes 23. Landing surfaces 22 and address electrodes 23 couple to substrate 21. Although not visible in the view of FIG. 2, deflectable element 25 is supported between a pair of support posts 24 by means of a torsion hinge. Support posts 24 suspend deflectable element 25 over landing surfaces 22 and address electrodes 23. In operation, deflectable element 25 is attracted toward either of the landing surfaces 22 by means of electrical signals applied to address electrodes 23. Deflectable element 25 has a reflective upper surface, which directs light in the direction consistent with the tilt angle of deflectable element 25.

Each landing surface 22 has a lubricating or passivating coating 22a to prevent sticking of deflectable element 25 to landing surface 22, when deflectable element 25 is deflected to the landing surface 22. For purposes of this description, both lubricative and passivating coatings are considered to be "passivating" coatings. Various coating materials have been used for passivation. An example of a landing surface coating, made from perfluoro-decanoic acid (PFDA), is described in U.S. Pat. No. 5,331,454, entitled "Low Reset Voltage Process of DMD". Similarly, U.S. Pat. No. 5,447,600, entitled "Polymeric Coatings for Micromechanical Devices", and U.S. patent application Ser. No. 5,512,374; entitled "PFPE Coatings for Micro-mechanical Devices", describe the use of polymeric coatings and PFPE coatings for landing surfaces. Each of these documents is assigned to Texas Instruments Incorporated and each is incorporated by reference herein. Each of these documents also describes methods for depositing the landing surface coating. These methods could be adapted for applying the coatings 28a and 28b of the present invention.

DMD element 20 is housed under a cover 26, which is optically transmissive. For display applications, cover 26 is transmissive in the visible wavelength range, but in other applications, DMD element 20 might be used to reflect non visible light, in which case cover 10 would be transmissive to the appropriate wavelength.

Like the cover 10 of FIG. 1, cover 26 has a window 27. Window 27 is typically made from a glass, such as type BK7. Window 27 is coated on both its inner surface and outer surface with coatings 28a and 28b, respectively.

Coatings 28a and 28b are made of a halogenated material. Any of the halogenated materials described above in connection with FIG. 1 may be used.

In the embodiment of FIG. 2, both surfaces of window 27 are coated, but it is coating 28a on the inner surface of window 12 that is of particular interest for DMD devices. During the useful life of a DMD, molecules of material from coating 22a may tend to migrate to uncoated surfaces. If this is the case and if the inner surface of window 27 has coating 28a, the inner surface of window 27 will not act as a chemically active "sink" for coating 22a. Furthermore, it may be that a given coating material adheres less readily to the material of window 27 than to the material of landing surface 22. Because of the migration of molecules from coating 28a, if coating 28a is made from the same material as coating 22a, coating 28a provides a source of coating Material that may migrate to landing surface 22. Alternatively, if a given coating adheres well to the material of window 27, then the coating will render the window surface relatively inert, so that migrating passivating or lubricating species will be delivered preferentially to the landing surface 22. Such species may migrate from other DMD components, such as getter surfaces from getter placed inside the DMD package. In either case, landing surface 22 will better retain its lubricative or passivation capability, extending the useful life of the DMD.

Thus, it may be advantageous for coatings 28a and 28b to have the same chemical composition as the coating 22a on landing surface 22. The selection of material for coatings 28a and 28b may include consideration of what materials are appropriate for coating 22a. As stated above, PFDA has been successfully used for coatings 22a. on landing surfaces 22, to prevent sticking of deflectable element 25. It is likely that coatings 28a and 28b will also be made from PFDA (($CF_3$) ($CF_2$)$_n$ COOH, n=8).

It is also possible that a DMD might be used in a damp environment. In the case, coating 28a or 28b might be desired to be made from a hydrophobic material regardless of any coating that may be placed on landing surface 22.

Referring again to FIG. 1, another example of an application for cover 10 is for an infrared transmitter or receiver. For such applications, cover 10 should not absorb in the infrared wavelengths of 2–5 and 8–12 microns. This requirement limits the chemical constituents of coating 12 as well as its thickness For infrared devices, coating 12 is made from a perfluorinated material having a high hydrophobic characteristic, such as PFDA. If coating 12 is ideally terminated with PFDA molecules, it is expected that drop contact angle analysis would indicate a large contact angle. More specifically, for sessile-drop contact angle analysis at room temperature with $CH_2I_2$, $W^*_{SLV}$ values at or below 50 dynes per centimeter can be expected, where $W^*_{SLV}$ is the reversible work of adhesion of the $CH_2I_2$ to the PFDA monolayer surface and $W^*_{SLV}=Y_L(1+\cos \theta)$. A $W^*_{SLV}$ value of 50 dynes per centimeter would correspond to a contact angle of approximately 100 degrees. The large contact angle is a result of a PFDA monolayer surface that renders $CF_3$ groups exclusively to the $CH_2I_2$ drop.

For infrared devices, during the manufacturing process of window 11, prior to being coated with coating 12, window 11 may receive a scratch-resistant coating, such as a diamond-like carbon (DLC) coating (not shown). Coating 12 would then be applied to the DLC coating. Because of the high surface roughness of the DLC coating, a deposition process for coating 12 that provides self-assembly from solution may result in better surface coverage than other deposition processes. Better surface coverage is desirable for better hydrophobicity of cover 10.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optically transmissive cover for an optical device, comprising:

an optically transmissive window having an inner surface and an outer surface with respect to said optical device; and a fluorinated coating chemically bonded to at least one surface of said window.

2. The cover of claim 1, wherein said optical device is a digital micromirror device and wherein said window and said coating are transmissive in the visible wavelength range.

3. The cover of claim 1, wherein said optical device is an infrared device and wherein said window and said coating are transmissive in an infrared wavelength range.

4. The cover of claim 1, wherein said fluorinated material is a perfluorinated material.

5. The cover of claim 4, wherein said perfluorinated material is a carboxylic acid.

6. The cover of claim 4, wherein said perfluorinated material is perfluoro-decanoic acid.

7. The cover of claim 4, wherein said perfluorinated material is a perfluorinated polymer.

8. A hydrophobic optical element, comprising:

an optically transmissive optical element; and a fluorinated coating chemically bonded to at least one surface of said optical element.

9. The optical element of claim 8, wherein said optical element is a lens.

10. An optically transmissive cover for a micro mechanical optical device having at least one micro mechanical element coated with a passivation material, comprising:

an optically transmissive window having an inner surface and an outer surface with respect to said optical device; and a fluorinated coating chemically bonded to said window, said coating inhibiting the loss of said passivation material from said micro mechanical element.

11. The device of claim 10, wherein said fluorinated material inhibits loss of said passivation material by inhibiting migration of said passivation material from said micro mechanical element.

12. The device of claim 10, wherein said fluorinated material inhibits loss of said passivation material by providing a source of said passivation material for migration to said micro mechanical element.

13. The device of claim 10, wherein said fluorinated material has substantially the same chemical composition as said passivation material.

14. The device of claim 10, wherein said fluorinated material is a perfluorinated material.

15. The device of claim 14, wherein said perfluorinated material is a perfluorinated carboxcylic acid.

16. The device of claim 14, wherein said perfluorinated material is a perfluoro-decanoic acid.

17. The device of claim 14, wherein said perfluorinated material is a perfluoro-polyether.

18. The device of claim 10, wherein said fluorinated material is a tetrafluoroethylene fluorocarbon polymer.

19. A micro mechanical device comprising:

one or more deflectable elements;

at least one address electrode adjacent said deflectable element;

at least one landing surface adjacent said deflectable element;

wherein a voltage applied between said deflectable element and said address electrode deflects said deflectable element toward said landing surface and said landing surface is located to contact said deflectable element deflected toward said landing surface and wherein said deflectable element touches said landing surface wherein deflected toward said landing surface; and an optically transmissive window for said micromechanical device, said window having a coating of fluorinated material.

20. The device of claim 19, wherein said landing surface is coated with a halogenated material that has substantially the same chemical composition as said coating on said window.

21. The device of claim 20, wherein said fluorinated material is a perfluorinated material.

22. The device of claim 21, wherein said perfluorinated material is a carboxylic acid.

23. The device of claim 21, wherein said perfluorinated material is perfluoro-decanoic acid.

24. The device of claim 21, wherein said perfluorinated material is a perfluorinated polymer.

* * * * *